United States Patent [19]

Ekiner et al.

[11] Patent Number: 5,091,216
[45] Date of Patent: Feb. 25, 1992

[54] REACTIVE POST TREATMENT FOR GAS SEPARATION MEMBRANES

[75] Inventors: Okan M. Ekiner, Wilmington; Richard A. Hayes, Hockessin; Philip Manos, Wilmington, all of Del.

[73] Assignees: E. I. Du Pont de Nemours and Company, Wilmington, Del.; L'Air Liquide, S.A., Paris, France

[21] Appl. No.: 622,269

[22] Filed: Dec. 5, 1990

Related U.S. Application Data

[63] Continuation of Ser. No. 175,499, Apr. 13, 1988, abandoned.

[51] Int. Cl.$^5$ ............................................. B05D 5/00
[52] U.S. Cl. ............................... 427/245; 427/243; 427/393.5
[58] Field of Search ............... 427/243, 245, 246, 333, 427/302, 393.5, 343

[56] References Cited

U.S. PATENT DOCUMENTS

| | | | |
|---|---|---|---|
| 3,640,753 | 2/1972 | Krauch et al. | 427/245 |
| 3,692,570 | 9/1972 | Traübel et al. | 427/245 |
| 3,789,027 | 1/1974 | Traübel et al. | 427/245 |
| 4,032,440 | 6/1977 | Yasuda | 210/234 |
| 4,230,463 | 10/1980 | Henis et al. | 55/16 |
| 4,259,183 | 3/1981 | Cadotte | 210/654 |
| 4,484,935 | 11/1984 | Zambini | 55/158 |
| 4,505,985 | 3/1985 | Schmidt et al. | 428/447 |
| 4,575,385 | 3/1986 | Brooks et al. | 55/158 |
| 4,613,625 | 9/1986 | Ford | 521/53 |
| 4,634,531 | 1/1987 | Nakagawa et al. | 210/639 |
| 4,654,055 | 3/1987 | Malon et al. | 55/158 |
| 4,659,474 | 4/1987 | Perry et al. | 210/638 |
| 4,711,793 | 12/1987 | Ostreicher et al. | 427/244 |
| 4,863,496 | 9/1989 | Ekiner et al. | 55/158 |

FOREIGN PATENT DOCUMENTS

| | | | |
|---|---|---|---|
| 107636 | 2/1984 | European Pat. Off. | |
| 57-094307 | 6/1982 | Japan | |
| 57-159503 | 10/1982 | Japan | 427/245 |
| 0092402 | 6/1983 | Japan | 427/245 |
| 61-107921 | 5/1986 | Japan | |

*Primary Examiner*—Janyce Bell

[57] ABSTRACT

A process is disclosed for sealing gas separation membranes through treatment with two monomeric materials which condense with each other to form a polymer such as a diamine and a di- or tri- acyl chloride.

37 Claims, No Drawings

REACTIVE POST TREATMENT FOR GAS SEPARATION MEMBRANES

This application is a continuation of application Ser. No. 07/175,499 filed Apr. 13, 1988, now abandoned.

BACKGROUND OF THE INVENTION

1. Field of the Invention

The present invention relates to a process for improving the selectivity of a gas separation membrane wherein at least two monomeric materials are applied to the surface of the membrane and reacted with each other to effectively seal defects in the membrane.

2. Prior Art

U.S. Pat. No. 3,325,330 discloses a multicomponent gas separation membrane comprising a porous membrane coated with the lamination of two films.

U.S. Pat. Nos. 3,874,986 and 3,980,456 disclose a multicomponent gas separation membrane comprising a laminate on a porous substrate.

U.S. Pat. No. 4,230,463 discloses a multicomponent gas separation membrane comprising a coating on a porous membrane.

EPO 0 107 636 discloses a multicomponent gas separation membrane comprising a porous anisotropic substrate membrane and a coating which is the condensation product of a silanol terminated poly(dimethylsiloxane) and any of certain crosslinking compounds.

U.S. Pat. No. 4,575,385 discloses a multicomponent anisotropic substrate membrane and a coating of monomeric permeation modifiers.

U.S. Pat. No. 4,634,531 discloses a multicomponent reverse osmosis separation membrane comprising a porous anisotropic substrate membrane and a coating which is the condensation product of amines and aldehydes.

U.S. Pat. No. 4,654,055 discloses a multicomponent gas separation membrane comprising a porous anisotropic substrate membrane and a coating comprising a Lowry-Bronsted base.

U.S. Pat. No. 4,659,474 discloses multicomponent ultrafiltration and reverse osmosis separation membranes comprising a porous anisotropic substrate membrane and a coating which is the condensation product of a polyethylene imine and any of certain crosslinking compounds.

U.S. Pat. Nos. 4,613,625; 4,661,526; and 4,668,706 disclose a multicomponent ultrafiltration separation membrane comprising an aliphatic polyamide porous anisotropic substrate and a coating which is the condensation product of the substrate and any of certain crosslinking compounds.

U.S. Pat. No. 4,484,935 discloses a multicomponent gas separation membrane comprising a porous anisotropic substrate membrane and a coating which is the condensation product of reactive poly(dimethylsiloxane) with and any of certain crosslinking compound with modified silane monomers.

U.S. Pat. No. 4,505,985 discloses a multicomponent separation membrane comprising a porous substrate membrane and a coating based on silicic acid heteropolycondensates produced by hydrolytic-polycondensation of a silicic acid derivative in the presence of water with an optional condensation catalyst and modifiers.

Japanese Patent Publication, Kokai 57-94307 discloses a multicomponent reverse osmosis separation membrane comprising a dry composite semipermeable membrane treated with an aqueous surfactant solution.

Japanese Patent Publication, Kokai 61-107921 discloses a multicomponent gas separation membrane comprising a porous substrate and a coating which is the condensation product of a reactive acetylene monomer with a catalyst.

U.S. Pat. Nos. 4,259,183; 4,277,344; 4,643,829; 4,529,646; 4,520,044 and 4,661,254 disclose multicomponent reverse osmosis membranes comprising a porous anisotropic substrate and a coating which is the interfacial condensation product of amines and acid chlorides.

SUMMARY

The present invention relates to a process for effectively sealing defects in the separating skin of a membrane to improve the permselectivity of the membrane with respect to at least one pair of gases. The treatment involves applying a solution of a first monomer to the surface of the membrane followed by applying a solution of a second monomer, which is reactive with the first monomer and allowing the two monomers to react to seal the defects. If the two monomers react slowly with each other, they can be applied from the same solution.

DETAILED DESCRIPTION

Most commercial gas separation membranes are asymmetric in nature. They are made by casting a film or extruding a hollow fiber from a solution of a polymer in a solvent mixture, evaporating a portion of the solvent from one side of the film or the outside of the hollow fiber and quenching in a nonsolvent. The resulting asymmetric membrane is characterized by a thin skin of polymer supported by a generally cellular structure. This provides a membrane having a thin effective separation member, which results in a high flux or permeation rate to gases, which is highly desirable. However, this effort to form a highly permeable membrane also leads to the formation of submicroscopic holes which pass gases indiscriminately causing the membrane to have an effective separation value for most pairs of gases which is less than the intrinsic separation value of the polymer from which the membrane is made.

The process of the present invention is effective on membranes which have a relatively wide range of hole sizes. The range of hole sizes which protrude through the dense separating layer of a membrane can be quantified by the ratio of total membrane surface area to total protruding hole cross-sectional area and/or the average hole diameter protruding through the dense separating layer of the separation membrane. The separation membranes useful in this invention typically have total membrane surface area to total protruding hole cross-sectional area ratios of at least 10:1 to $10^{12}$:1 or greater. More preferably, the ratios range from $10^3$:1 to $10^9$:1. The average hole diameter protruding through the dense separating layer of the separation membrane may vary widely and may range from approximately 5 to 20,000 Angstroms. More preferably, the average hole diameter ranges from approximately 5 to 1,000 Angstrom. It is an object of this invention that a wide range of hole sizes and distributions can be advantageously healed by the materials and processes described herein. The range of hole sizes which protrude through the dense separating layer of a separation membrane can be estimated by the selectivity of one gas over another gas for at least one pair of gases permeating through the membrane. The difference between the intrinsic separation factor for a material and the separation factor for a membrane prepared from that material can be related to the contribution of submicroscopic holes which protrude through the membrane dense separation layer. These holes essentially pass gases indiscriminately. Thus the preferred membrane starting materials have a selectivity of about 2 to 30 for the pair of gases helium and nitrogen.

The selectivity of one gas over another in a multi-component mixture by permeation through a gas separations membrane is controlled, in part, by the molecular free volume in the dense separating layer of the membrane. To obtain the intrinsic gas selectivity of a membrane, a perfect, pinhole free, dense separating layer must be formed during the membrane formation process. The integrity of this separating layer must be maintained throughout the gas separations module to retain a high gas membrane selectivity. This idealized pinhole-free membrane separating layer could be prepared by increasing the thickness of the layer. In so doing, holes would not be able to protrude through the separating layer. However, this results in a reduction of the gas permeation rate through the membrane.

Imperfections and defects in the dense separating layer of gas membranes arise in the membrane formation process and in consequent membrane handling, module fabrication and systems fabrication steps. The effective gas membrane separating efficiency can be advantageously enhanced by chemical treatment of the membrane to seal the defects. The materials and processes disclosed herein achieve this goal and surpass that taught in the prior art.

The process of the present invention entails the controlled application of a reactive monomeric substance or substances within the gas separations membrane or on the surface of the gas separations membrane. The reactive monomeric substance or substances may be diluted in a non-interacting fluid. After application, the reactive monomeric substance chemically reacts with another monomeric substance to form higher molecular weight materials or polymers. This effectively seals defects and imperfections of the membrane with, consequent, enhanced gas productivity.

A reactive monomer is defined as a di-or trifunctional chemical entity which chemically reacts with an added component(s) which may be applied in an additional procedure. Reactive first monomers include di- and triacyl halides, diisocyanates, and diglycidyl ethers. This procedure should not be considered limited to these alone. Added second monomers include di- and triamines, and di- and triols. Again, this is not a limitation of the procedure. The order of reactive monomer is not important and should not be taken as a limitation.

The reactive first monomers and the second monomers useful in the present invention are further defined as being essentially non-polymeric. The molecular weight of these materials is substantially under 1,000 atomic units, preferably under 500 atomic units. It has been found that the small molecular size of these components offers advantages over that found in the prior art. The small molecular size of these components allows them to penetrate more effectively into the membrane defects. The reactive chemical substances are then anchored in place through reaction as described above. This allows for improved sealing of the membrane than is taught in the prior art. Thus the polymer is believed to form and grow within the holes in the membrane.

Non-interacting fluids are defined as gases or liquids which do not substantially interfere with the reactive monomers of this procedure, the process of this procedure, the material of composition of the membrane or the membrane structure and morphology. Examples disclosed herein are nitrogen gas, helium gas, argon gas, hydrocarbon liquids, halocarbon liquids, etc. If more than one non-interacting fluid is used, the fluids should be miscible with each other in the proportions used. This should not, however, be taken as a limitation of this procedure.

The gas separations membrane sealed by this process can be of the form of an asymmetric or composite membrane. This membrane is preferably in the form of a hollow fiber. The polymeric substrate membrane may be the type described in U.S. Pat. No. 4,230,463 or by Cabasso et al in Research and Development of NS-1 and Related Polysulfone Hollow Fibers for Reverse Osmosis Desalination of Seawater, (NTIS PB-248666,7/1975) and may be formed from an aromatic polyamide polymer but is not limited to such materials.

The polymeric substrate membrane is preferably in the form of a hollow fiber having an outside diameter of about 75 to 1,000 microns, and preferably 175 to 350 microns and a wall thickness of about 25 to 300 microns. Preferably the diameter of the bore of the fiber is about one-half to three-quarters the outside diameter of the fiber. The preferred aromatic polyamide membranes are porous with the average cross-sectional diameter of the pores varying within the range of 5 to 20,000 Angstroms. The pore sizes are greater in the interior of the membrane and lesser near the surfaces of the membrane, such that the membrane is anisotropic or asymmetric. The porosity of the membrane is sufficient that the void volume of the membrane is within the range of 10 to 90, preferably about 30 to 70, percent based on the superficial volume, i.e., the volume contained within the gross dimensions of the porous separation membrane.

This sealing procedure is, however, useful for a wide variety of membrane compositions and types. Membrane materials may include polyamides, polyimides, polyesters, polyethers, polyether ketones, polyether imides, polyethylenes, polyacetylenes, polyether sulfones, polysulfones, polysiloxanes, polyvinylidene fluoride, polybenzimidazoles, polybenzoxazoles, polyacrylonitrile, cellulose acetates, polyazoaromatics, and copolymers therein. This should not be considered limiting. The sealing procedure of the present invention is substantially useful for any membrane material composition. Further, this procedure will find utility for many membrane morphologies, such as asymmetric or composite membranes.

The preferred material composition of these asymmetric substrate membranes are aromatic polyamide materials and polysulfone materials. These aromatic polyamides may be prepared by typical procedures as taught in the prior art, such as U.S. Re. 30,351. More preferably, the aromatic polyamide compositions are of the structure shown below:

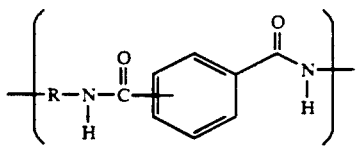

where R is

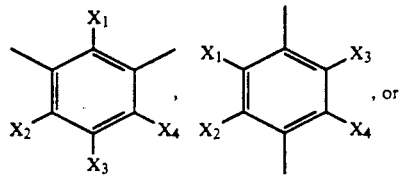

mixtures thereof such that $X_1$, $X_2$, $X_3$, and $X_4$ are independently chosen from —H, alkyl groups of 1 to 6 carbon atoms, aromatic groups having 6 to 13 carbon atoms, —$CO_2M$, —$SO_2M$, —$SO_3M$ or mixtures thereof, and M is independently —H, alkyl groups of 1 to 6 carbon atoms, aromatic groups having 6 to 13 carbon atoms, or alkali metals. Examples of such compositions are disclosed in, for example, EPO-219,878.

The intimate mechanistic details of this procedure are not well understood. They may vary for different material compositions. It is clear that the procedure reduces the effects that membrane defects and imperfections have on the gas-pair selectively. This is believed to be due to healing of these defects and imperfections through plugging or partial plugging.

The reactive nature of the monomeric sealing components disclosed herein offer great advantages over the prior art. This reactivity allows greater contact and adhesion of the sealing materials to the membrane. A larger range of pore size distribution can be effectively plugged by this procedure than is disclosed in the prior art. For example, in U.S. Pat. No. 3,980,456 discloses the use of a preformed organopolysilaxane-polycarbonate copolymer sealing material. The polymeric sealing materials used previously cannot effectively intrude into pores to plug them and are, therefore, only effective by applying a thin coating on top of the membrane material. This causes a substantial loss in membrane productivity. Henis and Tripodi in U.S. Pat. No. 4,230,463, teach that membrane sealing materials are only effective if their molecular size is large enough not to be drawn through the pores of the porous separation membrane during coating and/or separation operations (U.S. Pat. No. 4,230,463, col. 19, line 25-32; col. 28, line 55-58; col. 32, line 51-56). Further, they teach that when poly(siloxanes) are used as the membrane sealing material, the polysiloxane molecular weight must be higher than about 1,000 (U.S. Pat. No. 4,230,463; col. 20, line 23-27).

EPO 107 636 further teaches that the procedure taught in U.S. Pat. No. 4,230,463 suffers from environmental degradation encountered under some operation conditions. While this disclosure attempts to correct these environmental concerns, it still suffers from applying a coating of polysiloxane diols with molecular weights greater than 10,000 as discussed before.

The membrane sealing procedure disclosed herein does not suffer from this difficulty. The reactive sealing material may be effectively of any molecular size. This allows the substantial plugging of pore sizes too small for other procedures. Larger pore sizes are effectively sealed due to the reactive nature of the sealing material; the material reacts in place to form a plug to fit the pore size. This allows for greater latitude in the sealing procedure than has heretofor been disclosed. As a further advantage, the herein described procedure does not suffer from the environmental concerns described in the prior art.

The process of the present invention effects greater selectivity for gas separations membranes used among other things in recovery of hydrogen in refinery and ammonia plants; separation of carbon monoxide from hydrogen in syngas systems; separation of carbon dioxide or hydrogen sulfide from hydrocarbons; enrichment of oxygen and nitrogen from air for increased combustion or inerting streams, respectively.

EXAMPLES

Referential Example 1

This referential example describes the material and processes by which asymmetric hollow fiber aromatic polyamide gas separation membranes were produced. The hollow fiber membranes are spun from a hollow fiber spinnerette into a water coagulant as has been taught in the prior art.

A polymer solution was prepared with approximately 30% (weight) solids content of a 50:50% (weight) physical mixture of the aromatic polyamide prepared by polycondensation of 2,4,6-trimethyl-1,3-phenylene diamine with a 70:30% (weight) mixture of isophthaloyl chloride and terephthaloyl chloride and the aromatic polyamide prepared by polycondensation of 1,3-phenylene diamine with a 70:30% (weight) mixture of isophthaloyl chloride and terephthaloyl chloride and 30% (weight, based on polymer) lithium nitrate in N,N-dimethylacetamide. The polymer mixture is described in EPO-219,878. The above polymer solution was extruded through a hollow fiber spinnerette with fiber channel dimensions of outer diameter (OD) equal to 33 mils ($8.4 \times 10^{-4}$m) and inner diameter (ID) equal to 22 mils ($5.6 \times 10^{-4}$m) at the rate of 43 cc/min. A nitrogen gas pressure of 17 inches (0.43m) of water was maintained in the fiber bore to prevent fiber collapse. The spun fiber passed through a gap length of 6 meters maintained at 150° C. with a slow nitrogen purge into a water coagulant bath at 36° C. The wet fiber was collected at the rate of 240 ft/min. The water-wet fiber was dehydrated as taught in U.S. Pat. Nos. 4,080,743; 4,080,744; 4,120,098 and EPO-219,878. This specifically involved the sequential replacement of water with methanol, the replacement of methanol with FREON ®-113, and drying in a vacuum of 20 inches (0.5m) of mercury.

The fibers were cut into lengths and folded in the middle. The open ends of the fibers were potted in an epoxy resin within a one-quarter inch (0.00635 m) stainless steel tube to provide loops approximately nine inches (0.23 m) long. From 10 to 24 fibers were so potted for the individual tests. The tube was 10 inches (0.254 m) long and fitted with a gas inlet adjacent the potting resin and a gas outlet for the rejected gas at the end opposite the potting resin. The outlet was only used when mixed gases were being run.

Referential Example 2

This referential example describes the material and processes by which asymmetric hollow fiber polysulfone gas separation membranes were produced. The hollow fiber membranes are spun from a hollow fiber spinnerette into a water coagulant as has been taught in the prior art.

A polymer solution was prepared with 35% (weight) solids content of Udel ® P3500 polysulfone resin derived from bisphenol A and 4,4'-dichlorophenyl sulfone having a molecular weight of about 35,000 in N,N-dimethylacetamide. The above polymer solution was extruded through a hollow fiber spinnerette with fiber channel dimensions of outer diameter (OD) equal to 825 microns and inner diameter (ID) equal to 400 microns at the rate of 4.67 cm$^3$ per minute at 21° C. A solution of 87.5% (weight) N,N-dimethylacetamide in water was injected into the fiber bore at a rate of 0.6 cm$^3$ per minute. The spun fiber passed through an air gap length of 6.35 cm at 21° C. into a water coagulant bath maintained at between 3° C. and 21° C. The fiber was wound up on a drum at the rate of 20 meters per minute. The water-wet fiber was washed to remove residual organic solvent and then was air-dried. Gas separation modules were prepared as described in Referential Example 1.

Examples 1-3

Asymmetric polyamide hollow fiber membranes, prepared as in Referential Example 1, were consecutively tested for pure gas helium and nitrogen permeabilities at 400 psig (2.76×10$^6$ Pa), 25° C. Results are reported in Table 1.

The outer surfaces of the polyamide membranes were contacted with 2,4,6-trimethyl-1,3-phenylene diamine (DAM) solutions (weight) in FREON ®-113 for ten minutes, as described in Table 1. The solutions were decanted and the membranes were allowed to drain for 10 minutes. The outer surface of the polyamide membranes was then contacted with 1,3,5-benzenetricarboxylic acid chloride (TMC) solutions (weight) in FREON ®-113 for ten minutes at room temperature as described in Table 1. The solutions were decanted and the membranes dried in a vacuum oven (20 inches mercury) at room temperature for 16 hours. The membranes were consecutively tested for pure gas helium and nitrogen permeabilities at 400 psig (2.7633 10$^6$), 25° C. Results are reported in Table 1.

Examples 1, 2, and 3 were tested for mixed gas H$_2$/Methane (50:50) (mole) permeabilities at 600 psig (4.14×10$^6$ Pa) 250° C. Results are reported in Table 2.

Examples 1,2 and 3 illustrate the invention and have greatly improved selectivities.

TABLE 1

| Example | P$_{He}$ (GPU) | Selectivity He/N$_2$ | % DAM | % TMC | Treated P$_{He}$ (GPU) | Selectivity He/N$_2$ |
|---|---|---|---|---|---|---|
| 1 | 40 | 4.9 | 0.5 | 0.5 | 13 | 717 |
| 2 | 58 | 3.8 | 0.5 | 0.5 | 14 | 1,014 |
| 3 | 54 | 4.9 | 0.1 | 0.1 | 9 | 517 |

TABLE 2

| Example | P$_{H2}$ (GPU) | H$_2$/Me Selectivity | Temp (°C.) |
|---|---|---|---|
| 1 | 51 | 255 | 90.8 |
| 2 | 33 | 180 | 90.7 |
| 3 | 72 | 236 | 93.4 |

Control Example 1

An asymmetric polyamide hollow fiber membrane, prepared as described in Referential Example 1, was consecutively tested for pure gas helium and nitrogen permeabilities at 400 psig, 25° C. Results are reported below:

He Productivity: 47 GPU
He/N$_2$ Selectivity: 3.3

$$GPU = 10^{-6} \times \frac{cm^3 \text{ (STP)}}{cm^2 \cdot sec \cdot (cm \text{ Hg})}$$

The outer surfaces of the polyamide hollow fiber membrane were contacted with liquid FREON ®-113 (1,1,2-trichloro-1,2,2-trifluoroethane) for ten minutes at room temperature, and then dried in a vacuum oven (20 inches mercury) at room temperature for 16 hours. The membrane was consecutively tested for pure gas helium and nitrogen permeabilities at 400 psig (2.76×10$^6$ Pa), 25° C. Results are reported below:

He Productivity: 43 GPU
He/N$_2$ Selectivity: 3.9

This shows that the FREON ®-113 has only a slight effect on the performance of the fibers.

Control Example 2

A polyamide hollow fiber membrane, prepared as in Referential Example 1, was consecutively tested for pure gas helium and nitrogen permeabilities at 400 psig (2.76×10$^6$ Pa), 25° C. Results are reported below:

He Productivity: 73 GPU
He/N$_2$ Selectivity: 3.5

The outer surfaces of the polyamide hollow fiber membrane were contacted with a 0.5% 2,4,6-trimethyl-1,3-phenylene diamine (DAM) solution (weight) in FREON ®-113 for ten minutes at room temperature. The solution was decanted and the membrane dried in a vacuum oven (20 inches mercury) at room temperature for 16 hours. The membrane was consecutively tested for pure gas helium and nitrogen permeabilities at 400 psig (2.76×10$^6$ Pa), 25° C. Results are reported below:

He Productivity: 28 GPU
He/N$_2$ Selectivity: 10.3

This demonstrates that diamines, an example of one monomer component of the herein described sealing treatment, are not fully effective in sealing the fibers. Rather, the diamine probably softens the polymeric membrane resulting in partial pore collapse.

Control Example 3

An asymmetric polyamide hollow fiber membrane, prepared as in Referential Example 1, was consecutively tested for pure gas helium and nitrogen permeabilities at 400 psig (2.76×10$^6$ Pa), 25° C. Results are reported below:

He Productivity: 52 GPU
He/N$_2$ Selectivity: 3.6

The outer surfaces of the polyamide hollow fiber membrane were contacted with a 0.5% 1,3,5-benzenetricarboxylic acid chloride (TMC) solution (weight) in FREON ®-113 for ten minutes at room temperature.

The solution was decanted and the membrane dried in a vacuum oven (20 inches mercury) at room temperature for 16 hours.

The membrane was consecutively tested for pure gas helium and nitrogen permeabilities at 400 psig ($2.76 \times 10^6$ Pa), 25° C. Results are reported below:

He Productivity: 15 GPU
He/N$_2$ Selectivity: 28.7

This demonstrates that triacid chlorides, an example of one monomer component of the herein described sealing treatment, are not fully effective in sealing the fibers. The selectivity increase may be due to pluggage of small pores by the TMC or partial swelling of the membrane by TMC or its hydrolysis byproduct hydrochloric acid, resulting in partial pore collapse.

Example 4

An asymmetric hollow fiber membrane made as described in Referential Example 1 was consecutively tested for pure gas helium and nitrogen permeabilities at 400 psig ($2.76 \times 10^6$ Pa), 25° C. Results are reported below:

He Productivity: 54 GPU
He/N$_2$ Selectivity: 6.2

The outer surfaces of the membrane were consecutively contacted with a 0.5% by weight DAM solution in FREON ®-113 for ten minutes at room temperature, twice with FREON ®-113 for ten minutes each time, and a 0.5% by weight TMC solution in FREON ®-113 for ten minutes at room temperature. The membrane was dried in vacuum oven (20 inches mercury) at room temperature for 16 hours and then consecutively tested for pure gas helium and nitrogen permeabilities at 400 psig ($2.76 \times 10^6$ Pa), 25° C. Results are reported below:

He Productivity: 22 GPU
He/N$_2$ Selectivity: 772

The membrane was tested for mixed gas H$_2$/Me (50:50) (mole) permeabilities at 600 psig ($4.14 \times 10^6$ Pa), 92.2° C. Results are reported below:

H$_2$ Productivity: 44 GPU
H$_2$/Me Selectivity: 197

This demonstrates that the diamine is absorbed by the membrane substrate and is not rinsed off by Freon ®-113 rinses.

Examples 5-13

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 3.

The outer surfaces of the polyamide membranes were contacted with diethyltoluene diamine (DETDA) solutions in FREON ®-113 for ten minutes, as reported in Table 3. The solutions were decanted and the membranes were allowed to drain. The outer surfaces of the polyamide membranes were then contacted with 1,3,5-benzene tricarboxylic acid chloride (TMC) solutions (weight) in FREON ®-113 for ten minutes at room temperature as described in Table 3. The solutions were decanted and the membranes dried in a vacuum oven (20 inches mercury) at room temperature for 16 hours. The membranes were consecutively tested for pure gas helium and nitrogen permeabilities at 400 psig ($2.76 \times 10^6$ Pa), 25° C. Results are reported in Table 3.

Diethyltoluene diamine is an Ethyl Corporation product which is a mixture of isomers based on 2,4,6-diethylmethyl-1,3-phenylene diamine.

TABLE 3

| Example | Initial P$_{He}$ (GPU) | He/N$_2$ Selectivity | wt. % DETDA | wt. % TMC | Treated P$_{He}$ (GPU) | He/N$_2$ Selectivity |
|---|---|---|---|---|---|---|
| 5 | 49 | 3.5 | 1.0 | 0.5 | 13 | 728 |
| 6 | 68 | 3.7 | 1.0 | 0.1 | 20 | 485 |
| 7 | 62 | 6.5 | 0.5 | 0.5 | 28 | 746 |
| 8 | 62 | 6.4 | 0.5 | 0.1 | 24 | 672 |
| 9 | 67 | 5.7 | 0.5 | 0.1 | 30 | 779 |
| 10 | 70 | 5.1 | 0.5 | 0.1 | 27 | 181 |
| 11 | 64 | 5.1 | 0.25 | 0.25 | 31 | 785 |
| 12 | 80 | 4.9 | 0.25 | 0.1 | 32 | 727 |
| 13 | 52 | 3.6 | 0.1 | 0.1 | 8 | 402 |

Examples 14-16

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 4.

The outer surfaces of the polyamide membranes were consecutively contacted for ten minutes at room temperature with DETDA solutions in FREON ®-113, TMC solutions in FREON ®-113, and three washes of FREON ®-113 as described in Table 3. The membranes were dried in a vacuum oven (20 inches mercury) at room temperature for 16 hours and then consecutively tested for pure gas helium and nitrogen permeabilities at 400 psig ($2.76 \times 10^6$ Pa), 25° C. Results are reported in Table 4.

TABLE 4

| Example | Initial P$_{He}$ (GPU) | He/N$_2$ Selectivity | wt. % DETDA | wt. % TMC | Treated P$_{He}$ (GPU) | He/N$_2$ Selectivity |
|---|---|---|---|---|---|---|
| 14 | 67 | 6.5 | 0.5 | 0.5 | 34 | 895 |
| 15 | 70 | 5.0 | 0.25 | 0.25 | 32 | 985 |
| 16 | 53 | 4.8 | 0.25 | 0.1 | 25 | 754 |

This demonstrates that the treatment of the invention adheres to the membrane substrate and resists rinsing off with good solvents for the monomer components.

Examples 17-18

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 5.

The outer surfaces of the polyamide membranes were contacted for ten minutes at room temperature with the DETDA solutions and TMC solutions described in Table 5, after each treatment the fibers were washed three times with Freon ®-113. The membranes were dried in a vacuum oven (20 inches mercury) at room temperature for 16 hours and then consecutively tested for pure gas helium and nitrogen permeabilities at 400 psig ($2.76 \times 10^6$ Pa), 25° C. Results are reported in Table 5.

TABLE 5

| Example | Initial P$_{He}$ (GPU) | He/N$_2$ Selectivity | wt. % DETDA | wt. % TMC | Treated P$_{He}$ (GPU) | He/N$_2$ Selectivity |
|---|---|---|---|---|---|---|
| 17 | 80 | 5.4 | 0.5 | 0.1 | 33 | 1,041 |
| 18 | 87 | 4.8 | 0.25 | 0.1 | 36 | 117 |

This demonstrates that the process of this invention can include rises during and after the application of the monomer components.

Examples 19-20

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 6.

The outer surfaces of the polyamide membranes were consecutively contacted for ten minutes at room temperature with flowing solutions at the rate of 4.4 ml/minute of DETDA in FREON ®-113 and TMC solutions in FREON ®-113 as described in Table 3. The membranes were dried in a vacuum oven (20 inches mercury) at room temperature for 16 hours and then consecutively tested for pure gas helium and nitrogen permeabilities at 400 psig ($2.76 \times 10^6$ Pa), 25° C. Results are reported in Table 6.

This demonstrates that the embodiments of this invention can be achieved through a monomer solution flow process as well as a static process.

TABLE 6

| Example | Initial $P_{He}$ (GPU) | He/N$_2$ Selectivity | wt. % DETDA | wt. % TMC | Treated $P_{He}$ (GPU) | He/N$_2$ Selectivity |
|---|---|---|---|---|---|---|
| 19 | 80 | 7.5 | 0.5 | 0.5 | 28 | 1,119 |
| 20 | 75 | 8.1 | 0.1 | 0.1 | 36 | 1,111 |

Examples 21-22

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 7.

The outer surfaces of the polyamide membranes were contacted with a 0.063% DETDA solution in FREON ®-113 (weight) for 10 minutes. The solution was decanted and the fiber was washed with FREON ®-113. The outer surfaces of the polyamide membranes were then contacted with a 0.063% TMC solution (weight) in FREON ®-113 for 10 minutes. The solution was decanted and the fibers washed with FREON ®-113. The fibers were dried in a stream of nitrogen and then consecutively tested for pure gas helium and nitrogen permeabilities at 400 psig ($2.76 \times 10^6$ Pa), 25° C. Results are reported in Table 7.

Example 23

An asymmetric polyamide hollow fiber membrane made as described in Referential Example 1 was consecutively tested for pure gas helium and nitrogen permeabilities at 400 psig ($2.76 \times 10^6$ Pa), 25° C. Results are reported in Table 7.

The outer surfaces of the polyamide membrane were contacted with a 0.127% TMC solution (weight) in FREON ®-113 for 30 minutes. The solution was decanted and the fiber washed with FREON ®-113. The outer surfaces of the polyamide membrane were then contacted with a 0.12% DETDA solution (weight) in FREON ®-113 for 15 minutes. The solution was decanted, the fibers washed with FREON ®-113 and dried with a nitrogen purge. The membrane was consecutively tested for pure gas helium and nitrogen permeabilities at 400 psig ($2.76 \times 10^6$ Pa), 25° C. Results are reported in Table 7.

TABLE 7

| Example | Initial $P_{He}$ (GPU) | He/N$_2$ Selectivity | Treated $P_{He}$ (GPU) | He/N$_2$ Selectivity |
|---|---|---|---|---|
| 21 | 69 | 4.0 | 29 | 207 |
| 22 | 58 | 2.3 | 20 | 392 |
| 23 | 101 | 9.6 | 46 | 970 |

The membranes improved in selectivity from to 100 fold while only loosing a little over half of their permeation rate to He, indicating the excellent improvement in performance by this invention in sealing defects.

Example 23 was tested for mixed gas H$_2$/Me (50:50) (mole) permeabilities at 600 psig ($4.14 \times 10^6$ Pa), 94° C. Results are reported below:

H$_2$ Productivity: 116 GPU
H$_2$/Me Selectivity: 249

Examples 24-26

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 8.

The outer surfaces of the polyamide membranes were consecutively contacted for ten minutes at room temperature with DETDA solutions in FREON ®-113 and a mixture of isophthaloyl chloride:terephthaloyl chloride (ICl:TCl) (70:30) solutions in FREON ®-113 as described in Table 8. The membranes were dried in a vacuum oven (20 inches mercury) at room temperature for 16 hours and then consecutively tested for pure gas helium and nitrogen permeabilities at 400 psig ($2.76 \times 10^6$ Pa), 25° C. Results are reported in Table 8.

These examples demonstrate that diacid chlorides are useful in the herein described process.

TABLE 8

| Example | Initial $P_{He}$ (GPU) | He/N$_2$ Selectivity | wt % DETDA | wt % ICl/TCl | Treated $P_{He}$ (GPU) | He/N$_2$ Selectivity |
|---|---|---|---|---|---|---|
| 24 | 68 | 4.7 | 0.5 | 0.5 | 19 | 731 |
| 25 | 68 | 3.8 | 0.5 | 0.1 | 19 | 331 |
| 26 | 66 | 4.4 | 0.25 | 0.1 | 23 | 643 |

Example 27

An asymmetric polyamide hollow fiber membrane made as described in Referential Example 1 was consecutively tested for pure gas helium and nitrogen permeabilities at 400 psig ($2.76 \times 10^6$ Pa), 25° C. Results are reported below:

He Productivity: 58 GPU
He/N$_2$ Selectivity: 4.5

The outer surfaces of the polyamide membrane were consecutively contacted for ten minutes at room temperature with a 0.09 wt % 2,3,5,6-tetramethyl-1,4-phenylene diamine (DAD) solution in FREON ®-113 and a 0.1 wt % TMC solution in FREON ®-113. The membrane was dried in a vacuum oven (20 inches mercury) at room temperature for 16 hours and then consecutively tested for pure gas helium and nitrogen permeabilities at 400 psig ($2.76 \times 10^6$ Pa), 25° C. Results are reported below:

He Productivity: 12 GPU
He/N$_2$ Selectivity: 459

Example 28

An asymmetric polyamide hollow fiber membrane made described in Referential Example 1 was consecutively tested for pure gas helium and nitrogen permeabilities at 400 psig ($2.76 \times 10^6$ Pa), 25° C. Results are reported below:

He Productivity: 30 GPU
He/$N_2$ Selectivity: 3.9

The outer surfaces of the polyamide membrane were consecutively contacted for ten minutes at room temperature with a 0.1 wt % 4-methyl-1,5-pentane diamine solution in FREON ®-113 and a 0.1 wt % TMC solution in FREON ®-113. The membrane was dried in a vacuum oven (20 inches mercury) at room temperature for 16 hours. The membrane was consecutively tested for pure gas helium and nitrogen permeabilities at 400 psig ($2.76 \times 10^6$ Pa), 25° C. Results are reported below:

He Productivity: 5 GPU
He/$N_2$ Selectivity: 450

The membrane was tested for mixed gas $H_2$/Me (50:50) (mole) permeabilities at 600 psig ($4.14 \times 10^6$ Pa), 92.6° C. Results are reported below:

$H_2$ Productivity: 39 GPU
$H_2$/Me Selectivity 242

This example demonstrates aliphatic diamines are useful in the herein described process.

Examples 29-31

Asymmetric polyamide hollow fiber membranes made as described in Referential Example 1 were consecutively tested for pure gas helium and nitrogen permeabilities at 400 psig ($2.76 \times 10^6$ Pa), 2520 C. Results are reported in Table 9.

The outer surfaces of the polyamide membranes were consecutively contacted for ten minutes at room temperature with tris(2-aminoethyl)amine (TRIS) in FREON ®-113 and TMC solutions in FREON ®-113 as described in Table 6. The membranes were dried in a vacuum oven (20 inches mercury) at room temperature for 16 hours and then consecutively tested for pure gas helium and nitrogen permeabilities at 400 psig ($2.76 \times 10^6$ Pa), 25° C. Results are reported in Table 9.

These examples demonstrate that aliphatic triamines are useful in the herein described process.

TABLE 9

| Example | Initial $P_{He}$ (GPU) | He/$N_2$ Selectivity | wt % TRIS | wt % TMC | Treated $P_{He}$ (GPU) | He/$N_2$ Selectivity |
|---|---|---|---|---|---|---|
| 29 | 51 | 2.8 | 0.5 | 0.5 | 7 | 1,153 |
| 30 | 43 | 3.5 | 0.5 | 0.1 | 13 | 263 |
| 31 | 61 | 4.5 | 0.1 | 0.1 | 10 | 630 |

Examples 32-33

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 10.

The outer surfaces of the polyamide membranes were consecutively contacted for ten minutes at room temperature with TRIS solutions in FREON ®-113 and 70:30 ICl:TCl solutions (weight) in FREON ®-113 as described in Table 10. The membranes were dried in a vacuum oven (20 inches mercury) at room temperature for 16 hours and then consecutively tested for pure gas helium and nitrogen permeabilities at 400 psig ($2.76 \times 10^6$ Pa), 25° C. Results are reported in Table 10.

These examples demonstrate that aliphatic triamines, in combination with diacid chlorides, are useful in the herein described process.

TABLE 10

| Example | Initial $P_{He}$ (GPU) | He/$N_2$ Selectivity | wt % TRIS | wt % ICl:TCl | Treated $P_{He}$ (GPU) | He/$N_2$ Selectivity |
|---|---|---|---|---|---|---|
| 32 | 57 | 3.9 | 0.5 | 0.5 | 12 | 1,671 |
| 33 | 83 | 4.0 | 0.5 | 0.1 | 17 | 335 |

Examples 34-36

Asymmetric polyamide hollow fiber membranes made described in Referential Example 1 were consecutively tested for pure gas helium and nitrogen permeabilities at 400 psig ($2.76 \times 10^6$ Pa), 25° C. Results are reported in Table 11.

The outer surfaces of the polyamide membranes were contacted with a mixture containing 0.063% (weight) DETDA and 0.063% 2,4-toluenediisocyanate (weight) in FREON ®-113 (mixture was used immediately after preparation) at room temperature for the times noted in Table 11. The mixture was decanted and the membranes washed with FREON ®-113. The membranes were dried with a nitrogen purge and then consecutively tested for pure gas helium and nitrogen permeabilities at 400 psig, ($2.76 \times 10^6$ Pa), 25° C. Results are reported in Table 11.

TABLE 11

| Example | Initial PHe (GPU) | He/$N_2$ Selectivity | Solution Contact Time (h) | Treated PHe (GPU) | He/$N_2$ Selectivity |
|---|---|---|---|---|---|
| 34 | 86 | 6.4 | 1 | 47 | 660 |
| 35 | 110 | 7.4 | 24 | 43 | 443 |
| 36 | 126 | 5.5 | 24 | 51 | 533 |

Examples 34 and 36 were tested for mixed gas $H_2$/Me (50:50) (mole) permeabilities at 600 psig ($4.14 \times 10^6$ Pa), 94° C. Results are reported in Table 12.

TABLE 12

| Example | $PH_2$ (GPU) | $H_2$/Me Selectivity |
|---|---|---|
| 34 | 100 | 252 |
| 36 | 69 | 207 |

This demonstrates that diisocyanates can serve as the reactive monomer for this invention. This also demonstrates the use of a single solution which contains both the reactive monomer and added monomer of this invention.

Examples 37-39

Asymmetric polyamide hollow fiber membranes made as described in Referential Example 1 were consecutively tested for pure gas helium and nitrogen permeabilities at 400 psig ($2.76 \times 10^6$ Pa), 25° C. Results are reported in Table 13.

The outer surfaces of the polyamide membranes were contacted for ten minutes at room temperature with mixtures composed of an epoxy resin (EPON ®-826) and (DETDA) in FREON ®-113 (based on weight) as described in Table 13. The membranes were dried in a vacuum oven (20 inches mercury) at room temperature for 16 hours. The membranes were consecutively tested for pure gas helium and nitrogen permeabilities at 400 psig (2.76×10⁶ Pa), 25° C. Results are reported in Table 13.

TABLE 13

| Example | Initial $P_{He}$ (GPU) | He/N₂ Selectivity | wt. % DETDA | wt. % EPON ® | Treated $P_{He}$ (GPU) | He/N₂ Selectivity |
|---|---|---|---|---|---|---|
| 37 | 92 | 6.1 | 1.0 | 1.0 | 25 | 568 |
| 38 | 89 | 6.1 | 0.5 | 0.5 | 29 | 565 |
| 39 | 78 | 6.1 | 0.1 | 0.1 | 36 | 151 |

Example 38 was tested for mixed gas H₂/Me (50:50) (mole) permeabilities at 600 psig (4.14×10⁶ Pa), 90.2° C. Results are reported below:

H₂ Productivity: 68 GPU
H₂/Me Selectivity: 195

The epoxy resin contains glycidyl ether functions. A major constituent of EPON ®-826, a commercial product of Dow-Corning, is Bisphenol-A diglycidyl ether. This demonstrates that aromatic diglycidyl ethers can serve as the reactive monomer for this invention. This further demonstrates the use of a single solution containing the monomers of this invention.

Example 40

An asymmetric polyamide hollow fiber membrane made as described in Referential Example 1 was consecutively tested for pure gas helium and nitrogen permeabilities at 400 psig (2.76×10⁶ Pa), 25° C. Results are reported below:

He Productivity: 80 GPU
He/N₂ Selectivity: 7.2

The outer surface of the polyamide membrane was consecutively contacted for ten minutes at room temperature with the same mixture used in Example 39 two times. The membrane was dried in a vacuum oven (20 inches mercury) at room temperature for 16 hours and then consecutively tested for pure gas helium and nitrogen permeabilities at 400 psig (2.76×10⁶ Pa), 25° C. Results are reported below:

He Productivity: 33 GPU
He/N₂ Selectivity: 672

The membrane was tested for mixed gas H₂/Me (50:50) (mole) permeabilities at 600 psig (4.14×10⁶ Pa), 88.8° C. Results are reported below:

H₂ Productivity: 78 GPU
H₂/Me Selectivity: 240

Examples 41–44

Asymmetric polyamide hollow fiber membranes made as described in Referential Example 1 were consecutively tested for pure gas helium and nitrogen permeabilities at 400 psig (2.76×10⁶ Pa), 25° C. Results are reported in Table 14.

The outer surfaces of the polyamide membranes were contacted for ten minutes at room temperature with a mixture of 0.25 wt % ethylene glycol diglycidyl ether and 0.25 wt % DETDA in FREON ®-113 which had aged since its preparation as described in Table 14. The membranes were dried in a vacuum oven (20 inches mercury) at room temperature for 16 hours and then consecutively tested for pure gas helium and nitrogen permeabilities at 400 psig (2.76×10⁶ Pa), 25° C. Results are reported in Table 14.

This demonstrates that aliphatic diglycidyl ethers can serve as the reactive monomer for this invention. This also demonstrates the stability of the single solution which contains the composition of this invention.

TABLE 14

| Example | Initial $P_{He}$ (GPU) | He/N₂ Selectivity | Solution Age Hours | Treated $P_{He}$ (GPU) | He/N₂ Selectivity |
|---|---|---|---|---|---|
| 41 | 64 | 4.9 | 0.5 | 16 | 933 |
| 42 | 61 | 6.8 | 8.0 | 16 | 1,024 |
| 43 | 43 | 4.7 | 24 | 10 | 870 |
| 44 | 57 | 4.2 | 96 | 12 | 776 |

Examples 45–48

Asymmetric polyamide hollow fiber membranes made as described in Referential Example 1 were consecutively tested for pure gas helium and nitrogen permeabilities at 400 psig (2.76×10⁶ Pa), 25° C. Results are reported in Table 15.

The outer surfaces of the polyamide membranes were contacted for ten minutes at room temperature with a mixture of 0.50 wt % ethylene glycol diglycidyl ether and 0.50 wt % DETDA in FREON ®-113 which had aged since its preparation as described in Table 15. The membranes were dried in a vacuum oven (20 inches mercury) at room temperature for 16 hours and then consecutively tested for pure gas helium and nitrogen permeabilities at 400 psig (2.76×10⁶ Pa), 25° C. Results are reported in Table 15.

TABLE 15

| Example | Initial $P_{He}$ (GPU) | He/N₂ Selectivity | Solution Age Hours | Treated $P_{He}$ (GPU) | He/N₂ Selectivity |
|---|---|---|---|---|---|
| 45 | 63 | 4.5 | 0.5 | 13 | 655 |
| 46 | 54 | 4.7 | 8.0 | 15 | 1,046 |
| 47 | 36 | 5.2 | 24 | 7 | 684 |
| 48 | 41 | 4.6 | 96 | 11 | 757 |

Example 49

Asymmetric polysulfone hollow fiber membranes, made as described in Referential Example 2, were consecutively tested for pure gas hydrogen and methane permeabilities at 300 psig (2.07×10⁶ Pa), 23° C. Results are reported below:

H₂ Productivity: 60 GPU
H₂/Me Selectivity: 2.4

The outer surfaces of the polysulfone fiber membranes were contacted with a 0.5 wt % DETDA minutes while maintaining a vacuum (20 inches mercury) on the fiber bore. The solution was decanted. The outer surfaces of the membranes were contacted with a 0.5 wt % TMC solution in FREON ®-113 for 30 minutes at room temperature while maintaining a vacuum (20 inches mercury) on the fiber bore. The solution was decanted and the membrane dried with a nitrogen gas stream then tested for pure gas hydrogen and methane permeabilities at 300 psig (2.07×10⁶ Pa), 23° C. Results are reported below:

H₂ Productivity: 3.3 GPU
H₂/Me Selectivity: 51

The membrane was then tested for mixed gas hydrogen:methane (50:50) (mole) permeabilities at 600 psig (4.14×10⁶ Pa), 60° C. The results are reported below:

H₂ Productivity: 8.5 GPU
H₂/Me Selectivity: 42

Comparative Example

Asymmetric polysulfone hollow fiber membranes made as described in Referential Example 2 were consecutively tested for pure gas hydrogen and methane permeabilities at 300 psig ($2.07 \times 10^6$ Pa), 23° C. Results are reported below:

$H_2$ Productivity: 71 GPU $H_2$/Me Selectivity: 2.8

The outer surfaces of the polysulfone membrane were contacted with a 10% Dow Corning SLYGARD®-184 solution (weight) in hexane for 15 minutes while maintaining a vacuum (20 inches mercury) in the fiber bore. The solution was decanted and the membrane was dried in a vacuum oven at 40° C. for 24 hours. The membranes were consecutively tested for pure gas hydrogen and methane permeabilities at 300 psig ($2.07 \times 10^6$ Pa), 23° C. Results are reported below:

$H_2$ Productivity: 13 GPU $H_2$/Me Selectivity: 8.3

Dow Corning SYLGARD®-184 is an elastomeric silicone material which thermally cures to a crosslinked silicone material.

The comparison of Example 49 with Comparative Example 1 demonstrates that the sealing treatment of this invention gives superior results over that found in the teachings of the prior art. This may show that defects not sealable by the methods of the prior art are sealable by the improvements embodied in the present invention.

Example 50

The outer surfaces of a treated polysulfone hollow fiber membrane from Comparative Example 1 were contacted with a 0.5 wt % DETDA solution in FREON®-113 for 30 minutes at room temperature while maintaining a vacuum (20 inches mercury) in the fiber bore. The solution was decanted and the outer surfaces of the polysulfone fiber were contacted with a 0.5 wt % TMC solution in FREON®-113 for 30 minutes at room temperature while maintaining a vacuum (20 inches mercury) in the fiber bore. The solution was decanted and the membrane dried with a nitrogen purge. The polysulfone membranes were consecutively tested for pure gas hydrogen and methane permeabilities at 300 psig ($2.07 \times 10^6$ Pa), 23° C. Results are reported below:

$H_2$ Productivity: 12 GPU $H_2$/Me Selectivity: 42

The membranes were tested for mixed $H_2$:Me (50:50) (mole) permeabilities at 600 psig ($4.14 \times 10^6$ Pa), 60° C. Results are reported below:

$H_2$ Productivity: 19 GPU $H_2$/Me Selectivity: 22

Example 50 demonstrates that membranes treated as taught in the prior art can be exceptionally improved through the treatment of the present invention. This may show that defects not sealable by methods taught in the prior art are sealable by the improvements embodied in the present invention.

I claim:

1. A process for improving the selectivity of a gas separation membrane selected from the classes of asymmetric and composite membranes that have a gas separating portion supported by a cellular structure, comprising applying to the surface of said gas separating portion of said gas separation membrane at least two monomers, each of which has a molecular weight of under 1,000 atomic units, causing said monomers to react with each other to form a polymer to improve the selectivity of the membrane for separating two or more gases.

2. The process of claim 1 wherein at least one of the monomers is selected from the group consisting of di- and triacyl halides, diisocyanates, and diglycidyl ethers; and at least one of the other monomers is selected from the group consisting of di- and triamines, and di- and triols.

3. The process of claim 2 wherein one of said monomers is an aromatic acyl chloride.

4. The process of claim 3 wherein said other monomer is an aromatic amine.

5. The process of claim 4 wherein the aromatic acyl chloride is selected from the class consisting of 1,3,5-benzenetricarboxylic chloride, isophthaloyl chloride, terephthaloyl chloride and mixtures thereof.

6. The process of claim 5 wherein the aromatic amine is selected from the class consisting of 2,4,6-trimethyl-1,3-phenylene diamine, diethyltoluene diamine, and 2,3,5,6-tetramethyl-1,4-phenylene diamine.

7. The process of claim 6 wherein the gas separation membrane is in the form of a hollow fiber.

8. The process of claim 7 wherein the gas separation membrane is an aromatic polyamide.

9. The process of claim 7 wherein the gas separation membrane is formed of an aromatic polysulfone.

10. The process of claim 8 wherein a material healed by reaction of the monomers has a higher intrinsic separation value than a material of the membrane.

11. The process of claim 3 wherein the amine is aliphatic.

12. The process of claim 11 wherein the acyl chloride is selected from the class consisting of 1,3,5-benzenetricarboxylic chloride, isophthaloyl chloride, terephthaloyl chlorides and mixtures thereof.

13. The process of claim 12 wherein the amine is selected from the class consisting of 4-methyl-1,5-pentane diamine, Tris(2-aminoethyl) amine, and mixtures thereof.

14. The process of claim 13 wherein the gas separation membrane is in the form of a hollow fiber.

15. The process of claim 14 wherein the gas separation membrane is an aromatic polyamide.

16. The process of claim 2 wherein one of the monomers is an isocyanate.

17. The process of claim 18 wherein one of the monomers is an amine.

18. The process of claim 17 wherein the isocyanate is aromatic.

19. The process of claim 18 wherein the amine is aromatic.

20. The process of claim 19 wherein the isocyanate is 2,4-toluene diisocyanate.

21. The process of claim 20 wherein the amine is diethyltoluenediamine.

22. The process of claim 21 wherein the gas separation membrane is in the form of a hollow fiber.

23. The process of claim 22 wherein the gas separation membrane is formed of an aromatic polyamide.

24. The process of claim 2 wherein one of the monomers is a glycidyl ether.

25. The process of claim 24 wherein one of the monomers is an amine.

26. The process of claim 25 wherein the glycidyl ether is aromatic.

27. The process of claim 26 wherein the amine is aromatic.

28. The process of claim 27 wherein the amine is diethyltoluene diamine.

29. The process of claim 28 wherein the amine is diethyltoluene diamine.

30. The process of claim 29 wherein the gas separation membrane is in the form of a hollow fiber.

31. The process of claim 30 wherein the gas separation membrane is formed of an aromatic polyamide.

32. The process of claim 25 wherein the glycidyl ether is aliphatic.

33. The process of claim 32 wherein the amine is aromatic.

34. The process of claim 33 wherein the glycidyl ether is ethylene glycol diglycidyl ether.

35. The process of claim 34 wherein the amine is diethyltoluene diamine.

36. The process of claim 35 wherein the gas separation membrane is in the form of a hollow fiber.

37. The process of claim 36 wherein the gas separation membrane is formed of an aromatic polyamide.

* * * * *

UNITED STATES PATENT OFFICE
CERTIFICATE OF CORRECTION

PATENT NO. : 5,091,216
DATED : Feb. 25, 1992
INVENTOR(S) : Ekiner et al.

It is certified that error appears in the above-identified patent and that said Letters Patent is hereby corrected as shown below:

Col. 18 line 1, delete "18" and add -- 16 --.

Col. 19, lines 4&5 , delete "amine is diethylotoluene diamine" and inserting -- glycidyl ether is Bisphenoe-A diglycidyl ether--.

Signed and Sealed this

First Day of June, 1993

Attest:

MICHAEL K. KIRK

Attesting Officer     Acting Commissioner of Patents and Trademarks